United States Patent
Easwar et al.

(10) Patent No.: US 6,934,417 B2
(45) Date of Patent: Aug. 23, 2005

(54) TRANSCODING SCHEME FOR ASSISTANCE IN IMAGE TRANSFORMATIONS

(75) Inventors: Venkat V. Easwar, Cupertino, CA (US); Vivek Kumar Thakur, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 760 days.

(21) Appl. No.: 09/998,233

(22) Filed: Dec. 3, 2001

(65) Prior Publication Data

US 2002/0118390 A1 Aug. 29, 2002

Related U.S. Application Data

(60) Provisional application No. 60/257,787, filed on Dec. 22, 2000.

(51) Int. Cl.[7] .................................................. G06K 9/46
(52) U.S. Cl. .......................................... 382/235; 382/246
(58) Field of Search ................................. 382/233, 235, 382/236, 244–247

(56) References Cited

U.S. PATENT DOCUMENTS

| | | | | |
|---|---|---|---|---|
| 4,292,651 A | * | 9/1981 | Kretz et al. | ............... 348/409.1 |
| 6,233,359 B1 | * | 5/2001 | Ratnakar et al. | ............ 382/250 |
| 6,748,020 B1 | * | 6/2004 | Eifrig et al. | ................ 382/236 |

* cited by examiner

Primary Examiner—Bhavesh M. Mehta
Assistant Examiner—Duy M. Dang
(74) Attorney, Agent, or Firm—Robert D. Marshall, Jr.; W. James Brady, III; Frederick J. Telecky, Jr.

(57) ABSTRACT

This invention proposes to transcode the compressed image, that may be in the JPEG format for example, to an intermediate format that allows pseudo-random access. Such a pseudo-random access would that allow efficient image transformation. By using this format, in most cases a pixel is decoded only once in the entire image transformation process. This is certainly true for the most common transformation operations such as rotation by 90, 180 and 270 degrees. This transcoding would enable image transformations in printers whose memory is insufficient to store the entire decompressed image.

6 Claims, 4 Drawing Sheets

TRANSCODING SCHEME FOR ASSISTANCE IN IMAGE TRANSFORMATIONS

This application claims priority under 35 USC §119(e)(1) of Provisional Application No. 60/257,787, filed Dec. 22, 2000.

TECHNICAL FIELD OF THE INVENTION

The technical field of this invention is printers and more particularly conversion of print data in a page description language into print drive signals, a process called raster image processing.

BACKGROUND OF THE INVENTION

There is a problem of transforming an image. such as by scale, rotate, translate, etc., when the original image is in a compressed format. If the printer has limited memory., the image has to be transformed in-situ, because there is no space available to decompress the image fully for transformation. Image transformation is a common operation in postscript based printers. The transformation problem arises even in the simple case where an image in portrait mode is to be printed in the landscape mode. This corresponds to a 90° rotation transformation and is a common operation in printing. The problem is exacerbated by the fact that current compression methods, like Joint Photographers Expert Group (JPEG), are not designed for random access. Image transformation schemes often must address the source image in a random fashion. In such compressed formats this requires multiple decoding passes through the compressed source image.

SUMMARY OF THE INVENTION

This invention proposes to transcode the compressed image, that may be in the JPEG format for example, to an intermediate format that allows pseudo-random access. Such a pseudo-random access would that allow efficient image transformation. By using this format, in most cases a pixel is decoded only once in the entire image transformation process. This is certainly true for the most common transformation operations such as rotation by 90, 180 and 270 degrees. This transcoding would enable image transformations in printers whose memory is insufficient to store the entire decompressed image.

BRIEF DESCRIPTION OF THE DRAWINGS

These and other aspects of this invention are illustrated in the drawings, in which.

DETAILED DESCRIPTION OF PREFERRED EMBODIMENTS

Image transformation is a common task in raster image processing, that is changing print data from a page description language such as postscript to printer control data. An example of image transformation is rotating a source image that is in portrait mode to a landscape mode. In current art, image transformation methods assume that the source image is in an uncompressed form. Any compressed image must be fully decompressed before the transformation. This approach will not work for large images when there is limited memory. So there is a need for an image transformation scheme that works directly on compressed images.

Figure 1:
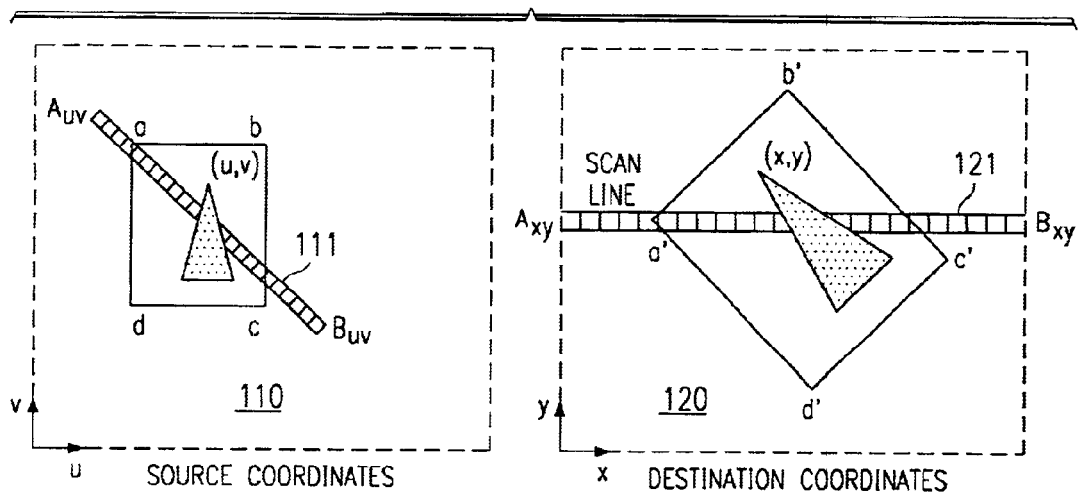
FIG. 1 illustrates the source and destination of an example image transformation.

FIG. 1 illustrates an image in source coordinates 110 and destination coordinates 120 of an example image rotation. The problem with popular compression schemes like JPEG is that they do not permit random-access. To access a particular pixel, the entire bitstream before that pixel has to be decoded. This creates a problem for image transformation as illustrated in FIG. 1. Scanline 121 from initial pixel $A_{xy}$ to pixel $B_{xy}$ in destination coordinates 120 does not map to a scanline in source coordinates 110. Note scanline 121 corresponds to an oblique line 111 in source coordinates 110. Because the source image is sequentially coded in JPEG, it is necessary to decode more pixels in source coordinates 110 than are used in the actual mapping to destination coordinates 120.

In the prior art the entire source image is decoded in preparation for transformation or a transformation technique is used that maps a source pixel to one or more destination pixels rather than mapping a destination pixel from source. If there is insufficient memory to store the entire uncompressed image the first technique will not work. If a banding approach is used to conserve memory space, the latter technique requires multiple decoding passes through the source. This is computationally expensive.

This invention proposes to define a new compression scheme that can provide pseudo-random access to individual pixels. Previously this required that a source image already coded in JPEG needed to be fully decompressed and compressed in the new format. This is a computationally time-consuming task. This invention proposes a more efficient scheme that transcodes the JPEG source image into a pseudo-random access JPEG-like compressed formal. The advantage of this approach is that the source image need not be fully decoded and coded again, but is rather transcoded, thereby saving computational time. Further, since the new format closely resembles JPEG much of the same hardware, such as discrete cosine transformers, variable length decoders and the like, can be used to accelerate the compression/decompression process.

The main advantage of this invention is that there is no need to provide memory to store a fully decompressed source image. Since the image may be the entire page, this could require a large amount of memory to store. In addition, the pseudo-random access capability eliminates or substantially reduces multiple decoding passes. This reduces computation time. The transcoding method has the advantage that the source image is not fully decoded and recoded, so the penalty of recoding JPEG compressed images is minimized.

In this invention, an image is divided into cells that are coded independently and the starting positions of the cells is stored in a pseudo-random access table. The image transformation algorithm decodes a cell when needed and discards it when a pixel in another cell is accessed.

This technique has many advantages. Rotation by 90° is a very common operation on printers which print a page in landscape mode. The invention requires effectively only one decompression cycle for compressed source images. Without the invention such image transformation may require: significant memory for storing the uncompressed image for rotation; significant processing time for JPEG compressed images, which permit only sequential access, including more than one decompression cycle. The invention facilitates using a banding approach if the input image is in a compressed format, by reducing the compression/decompression complexity. This invention has the advantage that the JPEG bitstream need not be fully decoded and coded into the new format. Instead the bitstream is only partially decoded.

Translation, rotation and scaling are typical operations in image transformation. Assuming a translation of $(t_u, t_v)$ followed by a rotation by the angle $\theta$, followed by a scaling of $s_u$ and $s_v$, the corresponding coordinate transformation can be represented as a single matrix M that transforms source pixel coordinates (u,v) to destination coordinates (x,y):
destination coordinates[x,y,1]=source coordinates[u,v,1]HM
where: M is $$M = \begin{bmatrix} 1 & 0 & 0 \\ 0 & 1 & 0 \\ t_u & t_v & 1 \end{bmatrix} \cdot \begin{bmatrix} \cos\theta & \sin\theta & 0 \\ -\sin\theta & \cos\theta & 0 \\ 0 & 0 & 1 \end{bmatrix} \cdot \begin{bmatrix} s_u & 0 & 0 \\ 0 & s_v & 0 \\ 0 & 0 & 1 \end{bmatrix}$$

$$M = \begin{bmatrix} s_u \cdot \cos\theta & s_v \cdot \sin\theta & 0 \\ -s_u \cdot \sin\theta & s_v \cdot \cos\theta & 0 \\ s_u \cdot (t_u \cdot \cos\theta - t_v \cdot \sin\theta) & s_v \cdot (t_u \cdot \sin\theta + t_v \cdot \cos\theta) & 1 \end{bmatrix}$$

The inverse mapping is just the matrix inverse $M^{-1}$.

An example of image transformation is illustrated in FIG. 1. Image abcd is transformed to a'b'c'd'. Scanline $A_{xy}$–$B_{xy}$ in the destination coordinates 120 does not map to a scanline in the source coordinate 110, but rather to the slanted line $A_{uv}$–$B_{uv}$ that intersects several scanlines. If the initial image is compressed and there is no memory to expand the image, then this remapping requires repeated compression/decompression cycles. This invention minimizes these cycles by transcoding the JPEG format to an intermediate format that is JPEG compatible and that also includes a table for pseudo-random access of cells.

Figure 2:
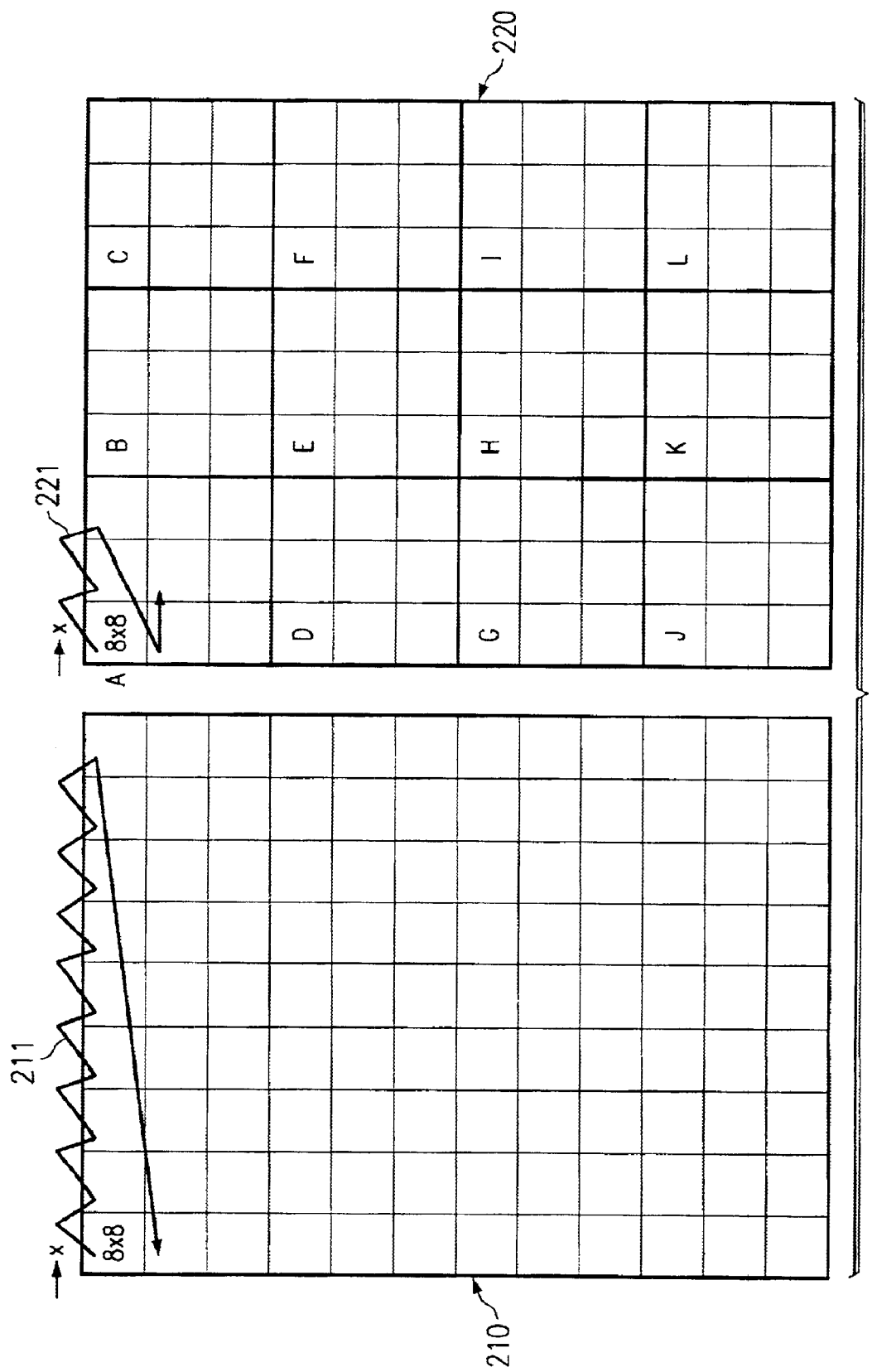
FIG. 2 illustrates the typical compressed image coding path and the coding path of this invention.

FIG. 2 illustrates an example of the transcoding of this invention. FIG. 2 shows an original image 210 divided into cells that are integer multiples of a basic 8×8 blocks used in JPEG. As shown in FIG. 2, the basic block are traversed in a raster scan fashion as indicated by path 211. The remaining lines are traversed in the same fashion. In the alternate compressed format 220 the image is divided into plural blocks A through L. Each of these superblocks is traversed in raster scan fashion as shown in path 221. Each additional line within each superblock A to L is traversed in the same fashion. The alternative compressed format 220 includes a header that gives the cell width and height. This header also includes a pseudo-random access table that stores the address locations of the top-left corners of each cell as 64 plus 6-bit number assuming a 64-bit address bus. The extra 6-bits are needed because the cell start point need not fall on byte boundaries. An example pseudo-random access table of the header is listed below in Table 1.

TABLE 1

| Cell | Byte Address (Hex) | Bit position |
|------|--------------------|--------------|
| A | 00000000 | 6 |
| B | 00000200 | 2 |
| C | 00000350 | 3 |

TABLE 1-continued

| Cell | Byte Address (Hex) | Bit position |
|------|--------------------|--------------|
| D | 00000500 | 0 |
| E | 00000700 | 1 |
| ... | ... | ... |
| L | 0000A000 | 4 |

The header may also include a Huffman table. An example is listed below in Table 2.

TABLE 2

| 1 | 10000000 |
|---|----------|
| 2 | 10000202 |
| 3 | 10000450 |
| 4 | 10000520 |
| 5 | 10000780 |
| ... | ... |
| n | 1000F000 |

Given a particular destination pixel, its corresponding address in the source image can be calculated using the coordinate transformation $M^{-1}$. Its corresponding cell can also be calculated using a similar transformation. If this cell is not currently resident in memory in a decoded format, it is decoded and the current cell may be discarded. Any suitable interpolation scheme, such as nearest neighbor, bilinear, etc., can be used to determine to the gray level at the device pixel.

The JPEG format is a popular for encoding images. The JPEG format is used in page description languages such as postscript. In the baseline JPEG technique, the DC frequency coefficients of the 8×8 blocks are differential pulse code modulation (DPCM) coded. The delta difference from the previous block's DC coefficient is coded. The JPEG format allows insertion of restart intervals that break this sequential coding. Such restart intervals can appear at arbitrary points in the bitstream. So to determine a gray level at a particular location, the entire bitstream for that image before that location may need to be decoded.

Figure 3:
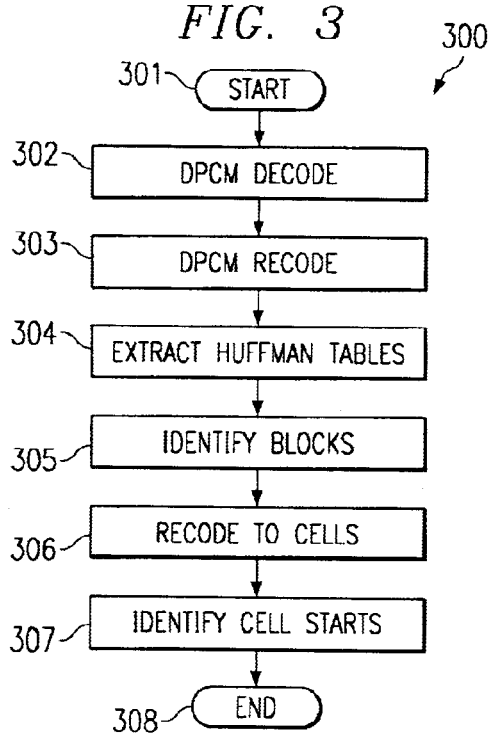
FIG. 3 is a flow chart illustrating the process of transcoding according to this invention.

This invention segments the JPEG coded image into independently coded cells as illustrated in FIG. 2. The invention transcodes these cells into a format that is randomly accessible at the cell level. This is called pseudo-random access. A flow chart of the algorithm is illustrated in FIG. 3. Process 300 begins at start block 301. Next process 300 decodes the DPCM DC coefficients of the JPEG bitstream (block 302). These coefficients are recoded with DPCM at block 303, but DPCM coding is not allowed across the cell boundaries A to L illustrated in FIG. 2. Process 300 next extracts all the Huffman tables from the bitstream (block 304). These Huffman tables are saved elsewhere with an associated numbering. For each cell, the corresponding Huffman table number is stored in its header. If new Huffman tables are used within a cell, that information is signaled with the standard JPEG define Huffman table (DHT) marker followed by the table number. Process 300 then identifies the blocks by a block count (block 305). This is maintained by identification of ends of blocks. This will require ability to find boundaries of the variable length codes, but does not require using the Huffman tables. Process 300 next recodes the bitstream into cells (block 306). This includes separately storing the corresponding starting address for each cell (block 307). Process 300 is then complete (end block 308).

A particular advantage of this transcoding technique is what is not required. A full decompression of the compressed image typically would require an Inverse Discrete Cosine Transform (IDCT). Recoding from a fully decoded image would require a corresponding Discrete Cosine Transform (DCT). The DCT and IDCT processes are multiply intensive and would require a large amount of processor time and capacity. The compressed image need not be fully decoded but is only partially decoded and recoded into the new format. Because the transcoding of this invention does not fully decode the compressed image, much otherwise necessary computation is avoided.

Figure 4:
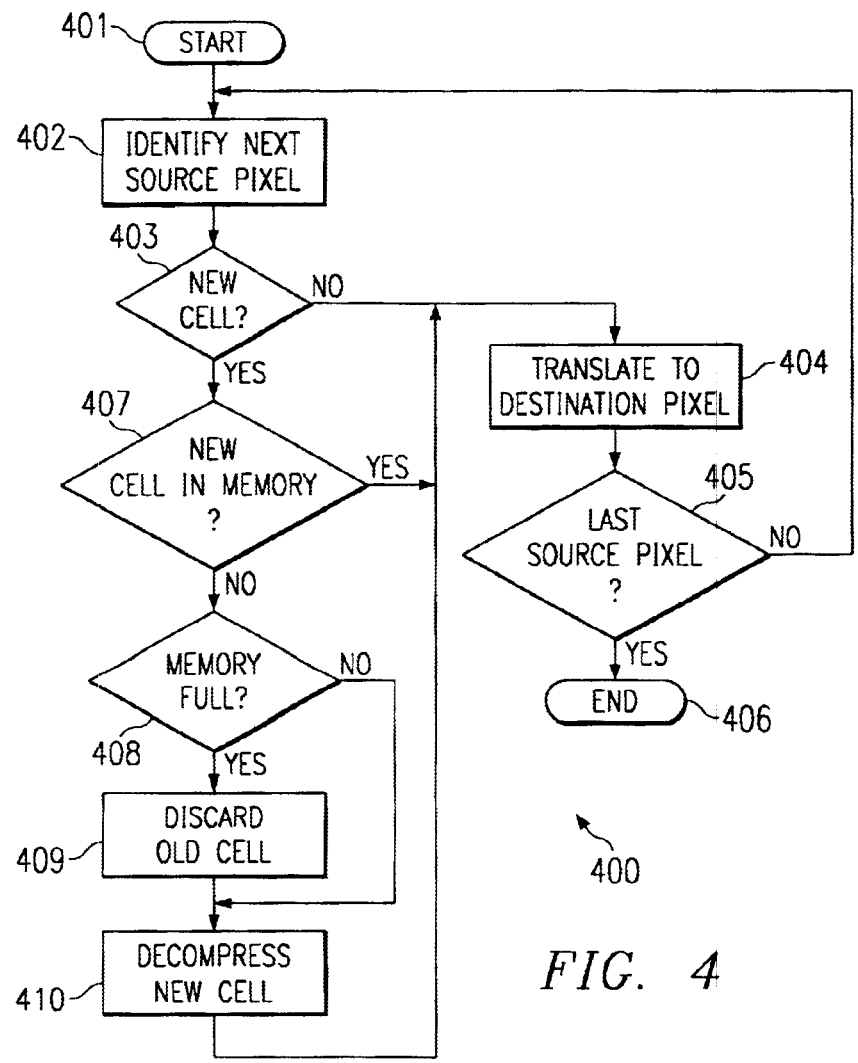
FIG. 4 is a flow chart illustrating image transformation employing the transcoded image of this invention.

FIG. 4 illustrates an example of an image transformation using the transcoding of this invention. Consider the scan line 111 ($A_{uv}$–$B_{uv}$) shown in FIG. 1. This traverses several cells in the input image. The cells that are traversed can be determined because the transformation matrix is known and so are the scan line coordinates. When the current pixel crosses a cell boundary, the next cell in the list is decompressed. Depending on memory constraints, the previous active cell discarded or temporarily retained.

The process 400 begins at start block 401. Process 400 first identified the next source pixel in the image transformation (block 402). Process 400 tests to determined if this next source pixel is in a new cell (block 403). If not, then process 400 processes the image transformation (block 404). Process 400 then tests to determine if this is the last source pixel (block 405). If so, then process 400 ends at end block 405). If not, process 400 returns to block 402 for the next source pixel.

If the next source pixel was in a new cell (yes at block 403), then process 400 tests to determine if this new cell is in memory (block 407). It is assumed that there is insufficient memory to store the whole decompressed image. However, there may be enough memory allocated to store several cells in decompressed form. If such memory is available, the new cell may already be stored in the memory (yes at block 407). If so, process 400 proceeds with the image transformation (block 404). If the new cell is not in memory (no at block 407), then process 400 tests to determine if the memory is full (block 408). If the memory is not full (no at block 408), meaning that enough memory if free to store another decompressed cell, then process 400 decompressed the new cell (block 410) storing the result in the available memory. Process 400 then proceeds with the image transformation (block 404). If the memory is full (yes at block 408), them process 400 discards an old cell (block 409), decompresses the new cell (block 410) and proceeds with the image transformation (block 404). In the event that only enough memory for one decompressed cell is available, then the new cell is never in memory (no at block 407) and the memory is always full (yes at block 408). Thus in this case, the old cell is discarded (block 409) before decompression of the new cell (block 410).

Figure 5:
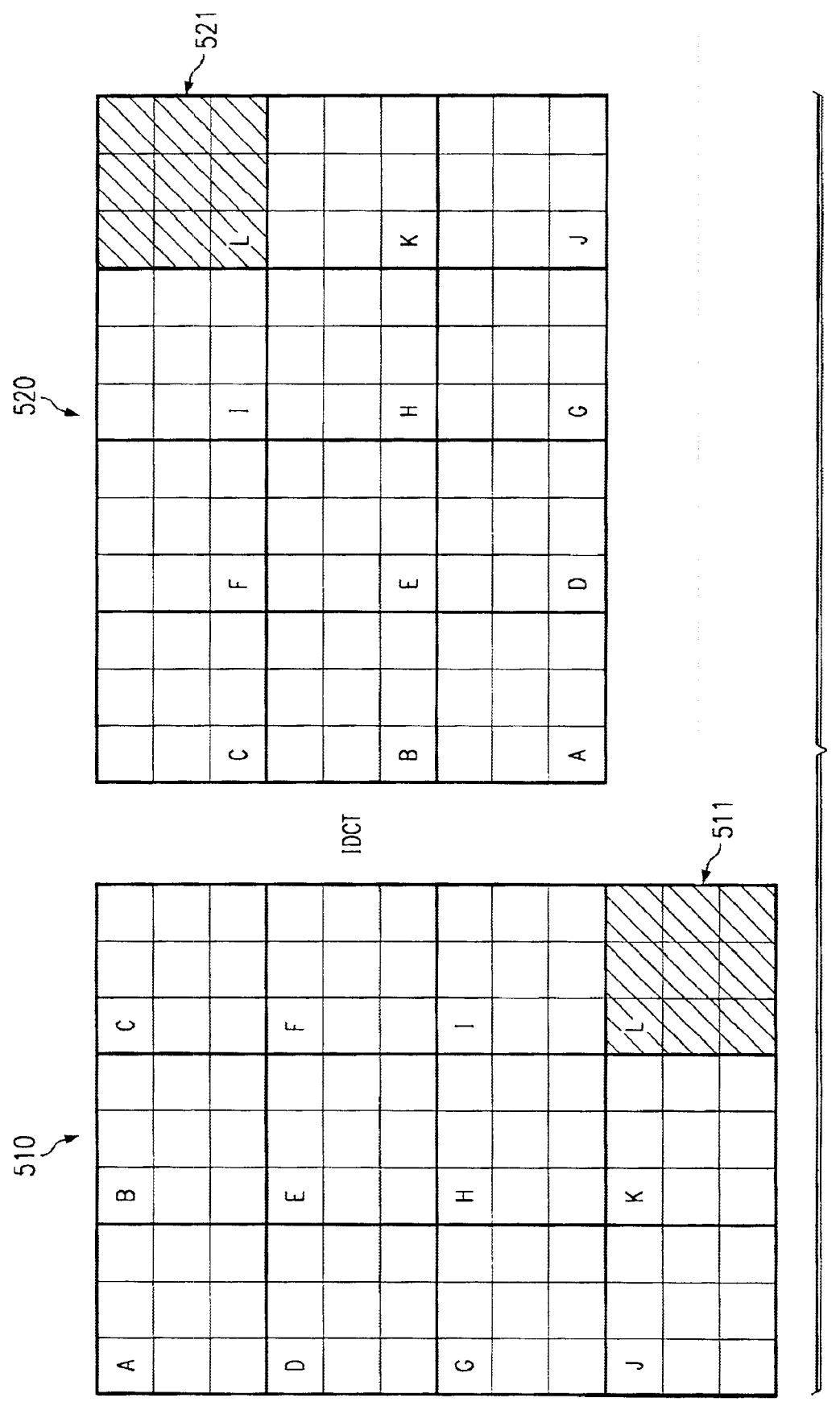
FIG. 5 illustrates a further example of image transformation using the techniques of this invention.

FIG. 5 illustrates an alternative technique called the scancell approach. This alternative technique remaps a scancell at a time. Thus the scancell L 511 in the source image 510 is decompressed, scaled, and rotated and mapped to scancell L 521 in the destination image 520 using a bit block transfer (BIT-BLT) operation. This approach is especially advantageous for the 0, 90, 180 and 270 degree rotation cases as it ensures that no cell is decompressed twice.

In the case of nearest neighbor interpolation method, one source pixel may map to several device pixels. This can occur because the source is usually at a lower resolution than the output device. For example, the source image can come from a 300 dots per inch (dpi) scanner whereas the printer resolution can be 600 dpi. In this case it may be advantageous to access the source pixels and for each source pixel determine all its destination pixels. The random access provided by the transcoding scheme is also an advantage here. For example referring back to FIG. 5, when destination block L is desired, the source block L is readily available because of the random-access capability.

Suppose the input image is uncompressed and not enough memory is available to store it. In this case the image can be compressed on the fly into the format discussed above. Then the techniques of this invention can be applied to image transformation. If the input image is a higher dpi than the output, the input image can be subsampled on the fly.

Figure 6:
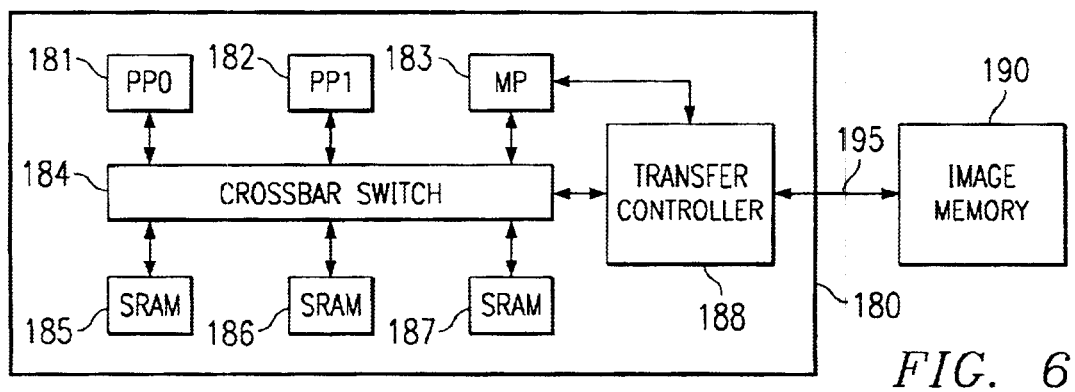
FIG. 6 shows a block diagram of the TMS320C82 DSP.

FIG. 6 illustrates a block diagram of a TMS320C82 digital signal processor (DSP) in an image data processing system capable of practicing this invention. The multiprocessor DSP is a single integrated circuit 180. Integrated circuit 180 a fully programmable parallel processing platform that integrates two advanced DSP cores DSP 181 and DSP 182, a reduced instruction set computer (RISC) master processor (MP) 183, multiple static random access memory (SRAM) blocks 185, 186 and 187, a crossbar switch 184 that interconnects all the internal processors and memories, and a transfer controller (TC) 188 that controls external communications. Transfer controller 188 is coupled to image memory 190 via bus 195. Note that transfer controller 188 controls all data transfer between integrated circuit 180 and image memory 190.

What is claimed is:

1. A method of transcoding image data in a compressed format comprising the steps of:
   decoding differential pulse code modulation DC frequency components of plural image blocks;
   partitioning the image into a plurality of image cells, each image cell including a plurality of image blocks;
   recoding DC frequency components of plural image blocks in differential pulse code modulated format, said differential pulse code modulated of said image blocks contained solely within a corresponding image cell;
   extracting the Huffman tables from the image data;
   storing said extracted Huffman tables together with an indication of an associated image cell in a header for said image cell;
   identifying image blocks by a block count; and
   recoding said identified image blocks into corresponding image cells.

2. The method of transcoding of claim 1, wherein:
   said step of extracting Huffman tables includes
      detecting any new Huffman tables within said image block, and
      storing said detected Huffman table with a define Huffman table marker in said corresponding image cell.

3. The method of transcoding of claim 1, wherein:
   said step of identifying image blocks by a block count includes
      detecting end of block identifiers in said image data, and
      assigning sequential numbers to identified image blocks.

4. The transcoding method of claim 1, further comprising the step of:
   storing a starting address of each recoded image cell.

5. The transcoding method of claim 1, further comprising the steps of:
   performing an image transformation from a source image in said transcoded format to a destination image including identifying a next source pixel in the image transformation, determining if said next source pixel is in a new image cell, if said next source pixel is not in a new image cell, then performing said image transformation, and if said next source pixel is in a new image cell, then decompressing said new image cell and preforming said image transformation, until said image transformation is performed on a last source pixel.

6. The transcoding method of claim 1, further comprising the steps of:

performing an image transformation from a source image in said transcoded format to a destination image including identifying a next source pixel in the image transformation, determining if said next source pixel is in a new image cell, if said next source pixel is not in a new image cell, then performing said image transformation, and if said next source pixel is in a new image cell, then decompressing said new image cell and performing said image transformation if memory is available to store said decompressed new image cell, else discarding a prior decompressed image cell, then decompressing said new image cell and performing said image transformation, and until said image transformation is performed on a last source pixel.

* * * * *